Figure 4:
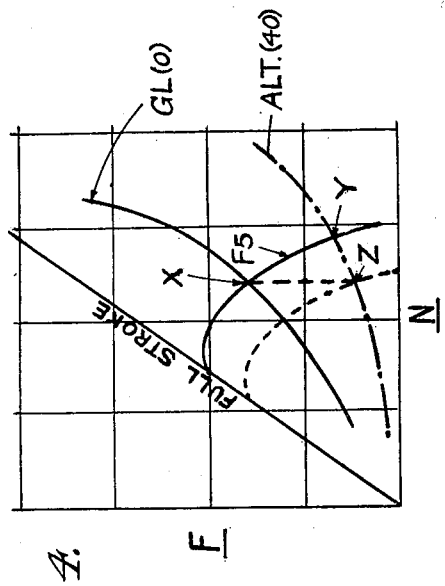
Figure 5:
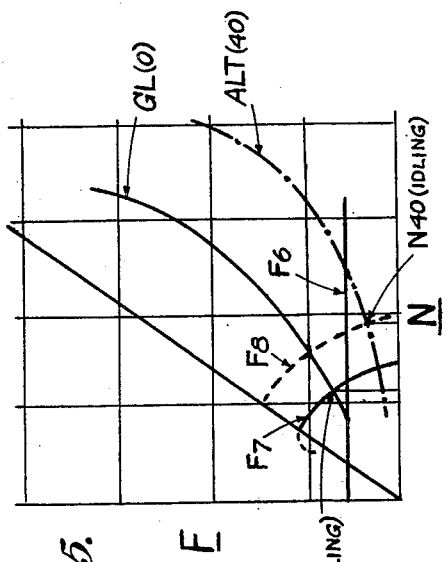

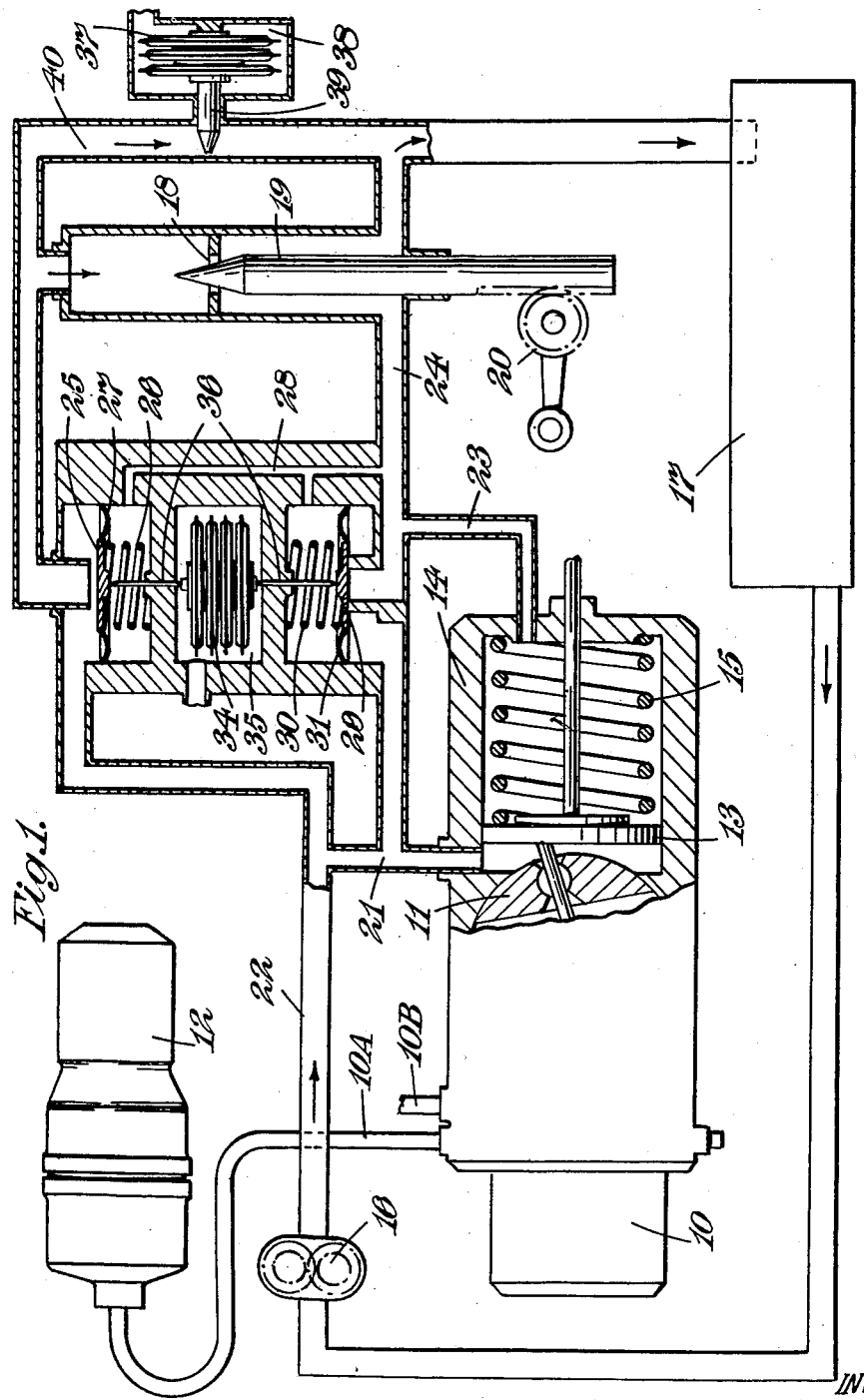

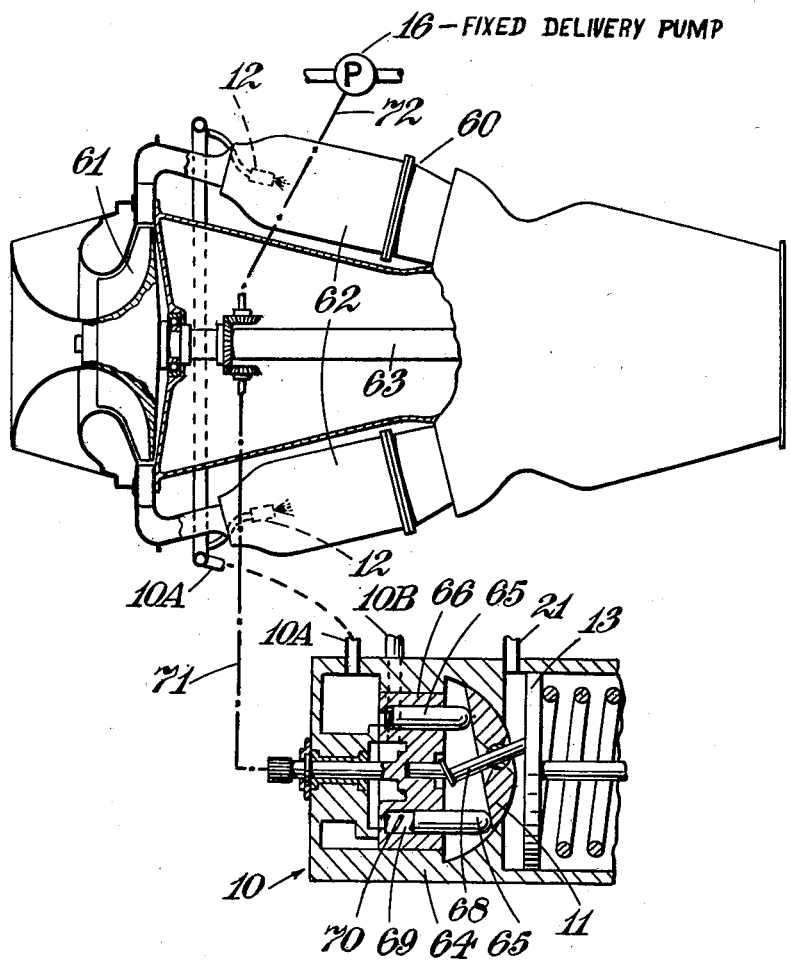

INVENTOR
KENNETH R. DAVIES
KARL HERBSTRITT
BY Wilkinson & Mawhinney
ATTORNEYS

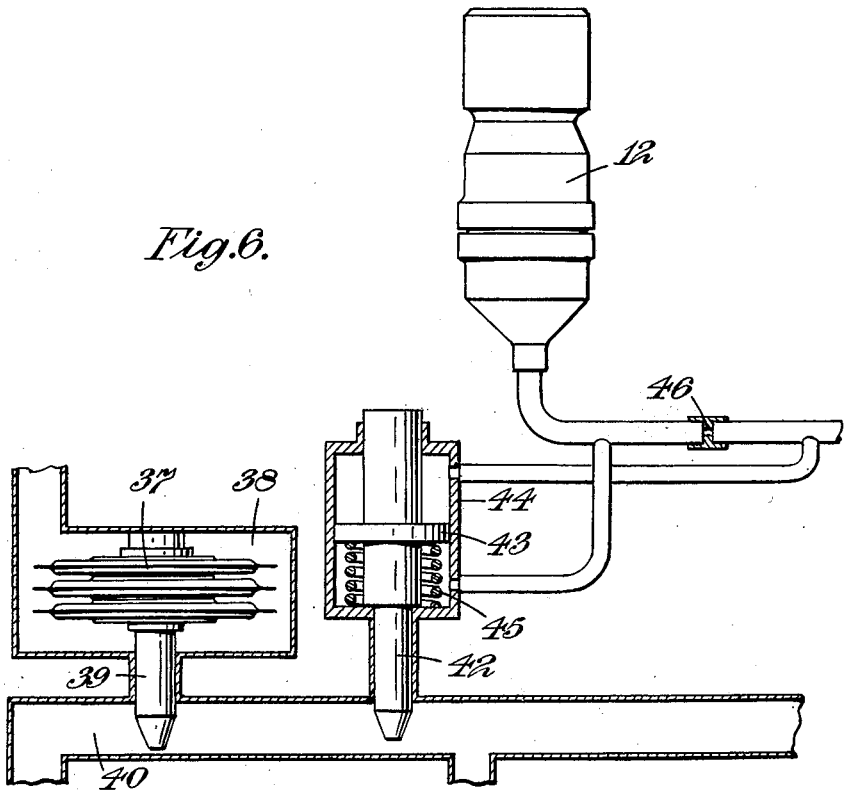
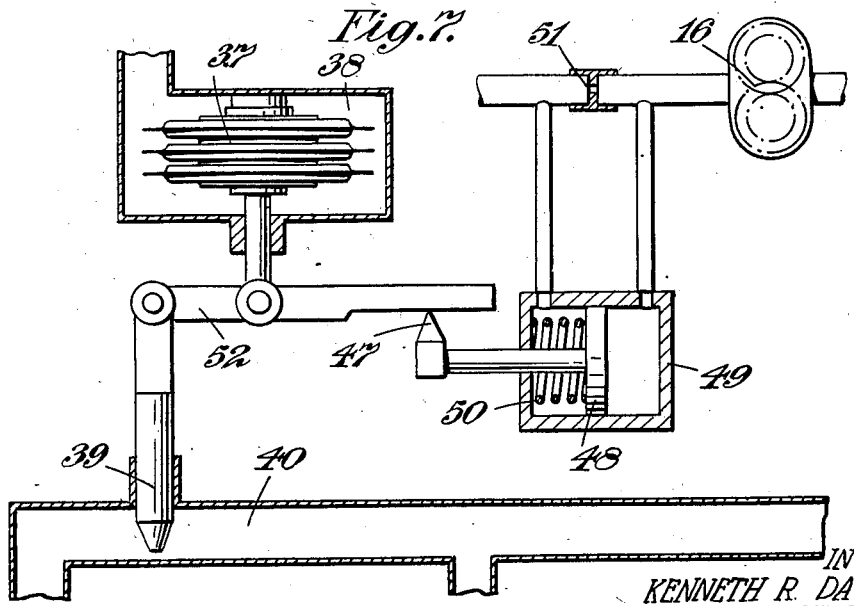

Patented Nov. 18, 1952

2,618,222

UNITED STATES PATENT OFFICE 2,618,222

FUEL SYSTEM FOR GAS-TURBINE ENGINES

Kenneth Roy Davies, Radbourne, near Derby, and Karl Herbstritt, Littleover, Derby, England, assignors to Rolls-Royce Limited, Derby, England, a British company Application May 11, 1948, Serial No. 26,424
In Great Britain May 12, 1947

9 Claims. (Cl. 103—38)

This invention relates to gas-turbine-engine fuel systems and has for an object to provide a fuel system (hereafter referred to as a fuel system of the kind specified) comprising control means including a constant capacity hydraulic pump driven at a speed proportional to engine speed and passing liquid through restricting means varied by means of an engine speed selecting device, and means normally responsive during running of the engine to the pressure drop across said restricting means and operative to reduce fuel delivery to the engine with increase of said pressure drop and vice versa, thereby to maintain a selected speed. A particular application of the invention is to such engines as are used for aircraft propulsion purposes, where variations of operational altitude give rise to corresponding changes in fuel consumption.

This invention has for an object to provide a fuel system of the kind specified, which will ensure appropriate fuel supply throughout the full range of operation of the engine.

Another object is to provide a fuel system of the kind specified comprising means to limit the maximum fuel delivery.

The invention achieves this object by limiting the minimum pressure drop to which the pressure responsive device can be subjected in operation.

In the application of the invention to fuel systems for gas-turbine-engines used for aircraft propulsion, it is preferred to provide means responsive to changes of altitude or ambient pressure to vary the maximum and/or minimum value of the pressure drop to which the pressure responsive device can be subjected in operation in accordance with such changes and thereby to vary the limits of fuel delivery in accordance with such changes.

The control means of the invention ensures that the fuel-flow to the engine during changes of speed cannot exceed preselected maximum and minimum limits whereby the possibility of over-fuelling and/or under-fueling during acceleration or deceleration can be avoided, and further that, where the gas-turbine-engine is used for aircraft propulsion purposes so that the engine fuel requirements will vary with changes in the air density due to changes of altitude, these maximum or minimum limits or both are varied in a manner appropriate to the variation of altitude.

Where means responsive to changes of altitude or ambient pressure is provided, such means may operate directly on valves defining the maximum and/or minimum pressure drops across the restricting means, in effect varying the resilient loading thereof; alternatively, a servo mechanism may be utilised in which movement is initiated by a barometric capsule or the like.

The following describes by way of example of this invention, control means suitable for a gas-turbine engine fuel system.

The description refers to the accompanying diagrammatic drawings in which

Figure 1A illustrates a typical gas-turbine engine and variable delivery fuel pump for delivering fuel to the engine, Figure 1 illustrates the control means and a part of the fuel system, Figures 2 to 5 illustrate graphically the action of the control means, and Figures 6 and 7 illustrate modifications of the control means.

Referring to Figure 1A there is illustrated a typical gas-turbine engine 60 and a variable delivery fuel pump 10 for delivering fuel to the engine.

The gas-turbine engine comprises a compressor 61 which delivers compressed air into a series of combustion chambers 62 which are disposed in a ring around the engine and of which two only are shown, a fuel delivery manifold connected with fuel injection devices 12 for delivering fuel into the combustion chambers 62 wherein the fuel is burnt, a turbine (not shown) which receives the combustion products from the combustion chamber 62 and drives a shaft 63 carrying the compressor rotor.

The fuel is delivered to the fuel injection devices 12 by the variable delivery fuel pump 10 through a delivery pipe 10A, the pump being driven from the shaft 63 through a drive indicated at 71.

The fuel pump 10 as illustrated comprises a body 64, a rotor 66 accommodated within the pump body 64, a plurality of plungers 65 which reciprocate in bores 69 in the rotor 66 against the action of springs 70 and means to adjust the stroke of the pump plungers 65 to vary the delivery of the pump. The means to vary the delivery of the pump in the construction of pump illustrated comprises a swash plate 11 carried on the crank portion of a spindle 68 which is axially movable with respect to the pump rotor 66. As the spindle 68 is adjusted axially of the rotor the inclination of the cam face of the swash plate 11 with respect to the rotor axis varies thus altering the stroke of the pump plungers. In operation, on rotation of the rotor 66 through the drive 71 fuel is drawn into the pump bores through a suction pipe 10B by the pump plungers 65 riding up the cam face of the swash plate 11 under the control of springs 70 and subsequently the fuel is delivered into the fuel delivery pipe 10A by the plungers riding down the cam face of the swash plate 11 against the action of the springs 70.

In the arrangement of Figure 1, the angle of inclination of the fuel pump swash plate is varied by means of a piston and cylinder device whereof the piston 13 is slidable in the cylinder 14 against the action of a spring 15, it being arranged that as the spring 15 is compressed the pump stroke decreases.

Hydraulic control means is provided to displace the piston 13.

The control means comprises a constant displacement pump 16, for instance a gear pump arranged to be driven at a speed proportional to the engine speed through a drive indicated at 72 (Figure 1A) and drawing liquid from a reservoir 17 and delivering it through an orifice 18 back to the reservoir. The effective area of the orifice 18 is controlled by a needle valve 19, the position of which is determined by a manually-operated lever 20 connected to the pilot's power lever.

A branch 21 is taken from the pump delivery pipe-line 22 to the cylinder 14 so that the delivery pressure of the pump is applied to the piston 13 to oppose the spring 15, and a branch 23 is taken from a pipe line 24 downstream of the orifice 18 to the opposite end of the cylinder 14.

The position of the piston 13 in the cylinder 14 is thus determined by the pressure drop across the orifice 18 and is thus a function of the engine speed, and of the effective area of the orifice. Furthermore, an increase in the pressure drop causes a decrease in the stroke of the fuel pump 10 so that the needle valve 19 is arranged to increase the effective area of the orifice to increase the engine speed.

With the control arrangement above described, rapid opening or closing movement of the control lever would produce a substantially instantaneous decrease or increase in the pressure drop applied to piston 13, and this in certain circumstances will give undesirable characteristics to the fuel delivery of the pump 10. For instance, if the engine is running at low speed, and the control lever is moved rapidly to the full throttle position, the pump 10 would be substantially instantaneously moved to full-stroke with the result that over-fuelling of the engine may occur.

Over-fuelling can give rise to excessive temperature in the engine combustion equipment and turbine, and possibly also to surge in the air compressor of the engine or to extinction of the flame. Again, if the control lever 20 is closed rapidly, a rapid increase occurs in the pressure drop, applied to piston 13 with a correspondingly rapid decrease in the fuel-pump stroke to its minimum stroke. This can result in extinction of the flame in the combustion equipment.

These disadvantages are overcome by providing means to limit the maximum and minimum pressure drop that can be applied to the piston 13. The pressure drop limiting means comprises a lift valve 25 which is loaded by a spring 26 and is arranged in the pipe-line 22 between the point of connection of the branch 21 and the orifice 18. The valve element 25 is conveniently carried by a diaphram 27 to isolate one side of the valve from the other. As will be seen, one side of the valve 25 is subjected to the delivery pressure of pump 16 and the other side is in communication through a duct 28 with the downstream side of the orifice 18.

The valve 25 will close when the pressure drop across orifice 18 drops to a predetermined value and ensures that the pressure applied to the piston 13 has a selected minimum value depending on the rate of the spring 26. This ensures that the stroke of the pump 10 cannot increase above a selected value, and that over-fuelling is avoided.

The spring 26 is preferably selected to have a rate such that the predetermined pressure drop at which the valve 25 opens is substantially unaffected by the rate of flow of liquid in the control circuit, so that the valve does not introduce a variable pressure drop when liquid is flowing through it.

A second lift valve 29 is provided to limit the maximum pressure drop. This valve is loaded by a spring 30 and is carried by a diaphragm 31. The valve 29 is connected hydraulically in parallel with the valve 25 and the orifice 18 to control the flow through a pipeline 32. This valve is loaded on one side by the delivery pressure of pump 16 and its other side is in communication through duct 28 with the downstream side of the orifice 18. The valve is therefore in the nature of a relief valve and opens when a preselected pressure drop is reached across orifice 18 thereby limiting the extent to which the stroke of pump 10 can be decreased. In this way under-fuelling of the engine is avoided.

It is also arranged that the maximum and minimum pressure drops that can be applied to the piston 13 are varied with variations in the altitude at which the engine is operating. For this purpose means responsive to the ambient atmospheric pressure is provided to vary the load on the valves 25, 29. This means in the arrangement illustrated comprises an evacuated capsule 34 located between the valves 25, 29 which are arranged to open in opposite directions, in a chamber 35 which is open to atmosphere or communicates with the engine compressor air intake. The capsule 34 is arranged to load the valves through push rods 36. Clearly on increase of altitude, the capsule expands and increases the load on the valves, and on decrease of altitude the valve loading is decreased. In the result, the maximum and minimum stroke settings of the fuel-pump 10 are less at altitude than those at ground level.

The capsule 34 can be, if desired, replaced by two capsules one for each of the valves 25, 29.

The capsule or capsules will be selected to have a rate giving the desired valve-load/altitude characteristics in accordance with the engine fuel requirements with change of altitude.

Figure 2:
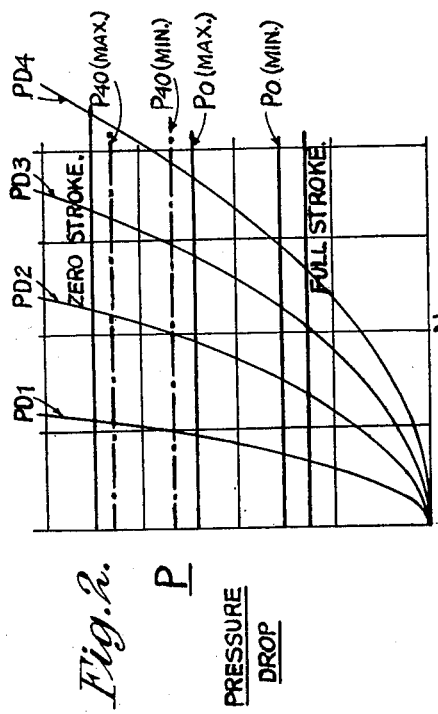
Figure 3:
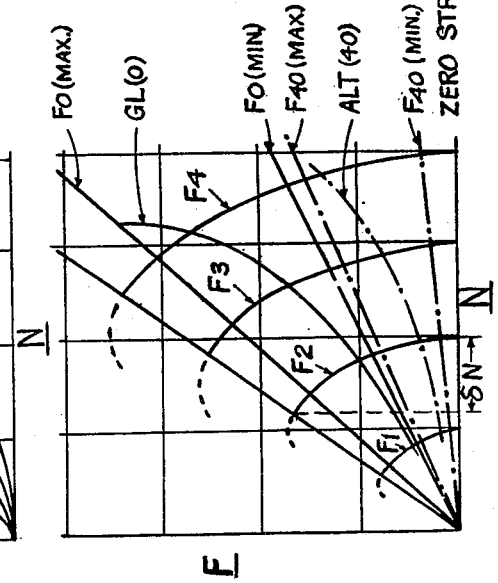

The operation of the control above described is illustrated in the graphs of Figures 2 and 3. Referring to Figure 2, there are shown curves giving the pressure drop applied to the piston 13 plotted against engine speed N. The pressure drop curves $PD_1$, $PD_2$, $PD_3$, $PD_4$ correspond to different settings of orifice 18, $PD_1$ corresponding to the idling speed selection by lever 20, $PD_4$ to maximum speed, $PD_2$ and $PD_3$ to intermediate settings. The line Full Stroke indicates the minimum pressure required just to displace the piston 13 from the full-stroke setting of the fuel pump and the line Zero Stroke indicates the pressure drop required to move the piston 13 fully to the minimum stroke setting of the fuel pump.

The effect of valve 25 and capsule 34 is illustrated by lines $P_{0 (Min)}$ and $P_{40 (Min)}$ showing that at ground level (indicated by Suffix 0) the minimum pressure that can be applied to the valve piston 13 is given by the line $P_{0 (Min)}$, and at altitude (say 40,000 feet) indicated by suffix 40 by the line $P_{40 (Min)}$. Thus the maximum permissible stroke of the pump 10 due to the governor at altitude is less than that at ground level, and that both are less than the maximum possible stroke of the pump, thereby avoiding over-fuelling.

The corresponding curves for valve 29 and capsule 34 are the lines $P_{0 (Max)}$ and $P_{40 (Max)}$ showing that the minimum permissible stroke of pump 10, is less at altitude than at ground level, and that both are greater than the minimum possible stroke thereby avoiding under-fuelling.

Referring to Figure 3 there are shown curves giving the fuel delivery F plotted against engine speed N. Full Stroke indicates the maximum possible fuel delivery and the line Zero Stroke the minimum possible fuel delivery, $F_{0 (Max)}$ and $F_{0 (Min)}$ the maximum and minimum permitted fuel deliveries at ground level due to the control of valves 25, 29, and $F_{40 (Max)}$ and $F_{40 (Min)}$ the maximum and minimum permitted fuel deliveries at high altitude (say 40,000 feet) due to the control of valves 25, 29 and capsule 34. The engine fuel requirement curves at ground level is the line GL(0) and that at the specified altitude is the line ALT(40). It will be clear that the rates of springs 26, 30 and capsule 34 will be selected so that the lines $F_{0 (Max)}$, $F_{0 (Min)}$ and $F_{40 (Max)}$, $F_{40 (Min)}$ will lie one on each side of the curves GL(0) and ALT(40) respectively.

Curves $F_1$, $F_2$, $F_3$, $F_4$ are fuel delivery curves at different orifice settings and the engine speed will be stabilised for a given orifice setting at a speed corresponding to the point of intersection of the fuel delivery curve appropriate to the orifice setting and the appropriate altitude consumption curve.

The control also includes means associated with the valve-controlled orifice 18 and responsive to changes of ambient atmospheric pressure to vary the pressure drops across the orifice 18 for any given setting thereof so that the fuel delivery of the pump 10 is varied in accordance with ambient atmospheric pressure. This barometric pressure responsive means comprises evacuated capsule 37 located and anchored at one end to a chamber 38 open to atmosphere or to the engine compressor air intake. The capsule is arranged by its expansion and contraction under variations in the ambient pressure to operate a valve 39 controlling the flow of liquid through a by-pass 40 around the orifice 18 from the upstream side to the downstream side thereof so that the pressure drop applied to the piston 13 increases with altitude. The restriction afforded by the capsule-controlled valve 39 can be arranged so that for any desired setting of the control lever, the speed of the engine is independent of altitude. The operation of the device will be clear from a consideration of Figure 4. $F_5$ is the fuel-delivery curve for a selected setting of orifice 18 and GL(0) and ALT(40) are the engine requirement curves at ground level and at altitude (e. g. 40,000 ft.). In the absence of the barometric control, for the selected orifice setting the engine speed would stabilise at a speed corresponding to the point X, i. e. the point of intersection of the curves $F_5$ and GL(0) and if now the aircraft climbs to an altitude corresponding to curve ALT(40), the engine speed will increase and stabilise at a speed corresponding to point Y. The barometric control however, ensures that the speed remains unaltered by displacing the curve $F_5$ to the left so that at each altitude the curve $F_5$ intersects the appropriate consumption curve on the line XZ which represents a constant engine speed.

In certain cases it may be desired to cause the capsule to have a greater or less effect at different engine speeds, so that, for instance, at low engine speeds e. g. at idling speeds, for a given setting of the orifice 18 the engine speed increases with altitude, while at higher engine speeds the engine speed does not change with altitude for a given orifice setting.

For this purpose an arrangement as illustrated in Figure 6 may be employed. In this arrangement the bypass 40 includes a second needle valve 42 which is controlled by a piston 43 working in a cylinder 44 against a spring 45. The piston is controlled by the pressure drop across a fixed restriction 46 in the fuel pipe-line to the injection device 12 and the spring strength is selected so that at fuel flows above that represented by the line $F_6$ (Figure 5) the spring is full compressed and the valve 42 acts as a fixed restriction. When the fuel flow decreases to a value below that represented by the line $F_6$ the valve 42 opens reducing the effective restriction by the orifice 18 thereby giving an increased fuel flow for the orifice setting.

Thus, when the orifice is set, for example, for idling, the engine speed at ground level will be given by the point $N_0$ (Idling) and at altitude by the point $N_{40}$ (Idling) obtained by displacing the curve $F_7$ to the right to a position $F_8$, which is equivalent to increasing the effective area of orifice 18.

Another arrangement for the same purpose is illustrated in Figure 7. In this arrangement, the capsule 37 is connected to needle valve 39 through a lever 52 which has a variable fulcrum 47. The position of the fulcrum 47 is determined by a piston 48 working in a cylinder 49 against a spring 50. The piston 48 is displaced by the pressure drop across a fixed orifice 51 which is preferably located immediately downstream of the governor pump 16. The position of the piston 48 is thus dependent on the speed of the engine.

In operation, as the engine speed is increased the piston will travel to the left thereby moving the fulcrum 47 to increase the effect of the capsule 37 on the needle valve 39. Thus at low speeds, the capsule will have less effect on the setting of the needle valve 39 than at high engine speeds, so that the altitude correction afforded at low speeds is less than at high speeds and a rise of engine speed with low speed settings of the orifice 18 is obtained on increase of altitude.

In certain cases it may be desirable to vary the loading of the valves 25, 29 by means responsive to engine speed. This means may be comparable with the device illustrated in Figure 6 or Figure 7 applied to vary the loading on one or both of the valves 25, 29. For example, such a speed responsive means may be arranged to increase or decrease the maximum fuel at selected engine speeds, according to the characteristics of the engine to which the fuel control is applied.

Referring to Figure 3, the use of such engine speed responsive means may result in the lines $F_{0 (Max)}$ and $F_{40 (Max)}$ departing from the straight line form illustrated and conforming more closely to the fuel requirement curves $GL_0$ and $ALT_{40}$.

We claim:

1. In a control system for a variable delivery fuel pump of a gas-turbine engine, a fixed capacity pump arranged to be driven at a speed proportional to engine speed, a discharge conduit for said fixed capacity pump, a first pressure tapping from said conduit, a second pressure tapping from said conduit spaced downstream of said first pressure tapping along said conduit, a variable area flow-restricting device in said conduit between said pressure tappings, and a pressure-responsive device responsive to the pressure difference between the pressure in said first pressure tapping and the pressure in said second pressure tapping, and connected to the variable delivery fuel pump so as to increase its delivery when said pressure difference decreases and vice versa, a valve in said conduit between said two pressure tappings, a second pressure-responsive device arranged to be responsive to said pressure difference and connected to load said valve with an opening load proportional to said pressure difference, and a loading device including a third pressure-responsive device responsive to atmospheric pressure, which loading device is connected to load said valve with a closing load adjusted in accordance with the value of atmospheric pressure, whereby said valve is closed when said opening load is less than said closing load and is open when said opening load exceeds said closing load.

2. In a control system for a variable delivery fuel pump, of a gas turbine engine, a fixed capacity pump arranged to be driven at a speed proportional to engine speed, a discharge conduit for said fixed capacity pump, a first pressure tapping from said conduit, a second pressure tapping from said conduit spaced downstream of said first pressure tapping along said conduit, a variable restriction in said conduit between said pressure tappings and a pressure responsive device responsive to the pressure difference between the pressure in said first pressure tapping and the pressure in said second pressure tapping and connected to the variable delivery fuel pump so as to increase its delivery when said pressure difference decreases and vice versa, a valve in said conduit between said two pressure tappings, a flexible diaphragm carrying said valve and arranged to be subjected on the one side to pressure in said first pressure tapping and on the other side to pressure in said second pressure tapping whereby said valve is loaded to open with a load proportional to said pressure difference, and a loading device connected to load said valve with a closing load.

3. In a control system for a variable delivery fuel pump of a gas-turbine engine, a fixed capacity pump arranged to be driven at a speed proportional to engine speed, a discharge conduit for said fixed capacity pump, a first pressure tapping from said conduit, a second pressure tapping from said conduit spaced downstream of said first pressure tapping along said conduit, a variable-area flow-restricting device in said conduit between said pressure tapping, and a pressure-responsive device responsive to the pressure difference between the pressure in said first pressure tapping and the pressure in said second pressure tapping, and connected to the variable delivery fuel pump so as to increase its delivery when said pressure difference decreases and vice versa, a valve in said conduit between said two pressure tappings, a flexible diaphragm carrying said valve and arranged to be subjected on the one side to pressure in said first pressure tapping, and on the other side to pressure in said second pressure tapping whereby said valve is loaded to open with a load proportional to said pressure difference, and a loading device including a pressure-responsive device responsive to atmospheric pressure, which loading device is connected to load said valve with a closing load which is adjusted in accordance with the value of atmospheric pressure.

4. In a control system for a variable delivery fuel pump of a gas turbine engine, a fixed capacity pump arranged to be driven at a speed proportional to engine speed, a discharge conduit for said fixed capacity pump, a first pressure tapping from said conduit, a second pressure tapping from said conduit spaced downstream of said first pressure tapping along said conduit, a variable restriction in said conduit between said measure tappings, and a pressure responsive device responsive to the pressure difference between the pressure in said first pressure tapping and the pressure in said second pressure tapping and connected to the variable delivery fuel pump so as to increase its delivery when said pressure difference decreases and vice-versa, a valve in said conduit between said two pressure tappings, a second pressure responsive device arranged to be responsive to said pressure difference and connected to load said valve with an opening load proportional to said pressure difference, and a loading device including a precompressed spring arranged to load said valve with a preselected closing load, and a pressure responsive device arranged to be responsive to atmospheric pressure and arranged to load said valve with a load proportional to the value of said atmospheric pressure, whereby said valve is closed when said opening load is less than the resultant of said two closing loads and is open when said opening load exceeds the resultant of said two closing loads.

5. In a control system for a variable delivery fuel pump of a gas-turbine engine, a fixed capacity pump arranged to be driven at a speed proportional to engine speed, a discharge conduit for said pump, a first pressure tapping from said conduit, a variable-area flow-restricting device in said conduit downstream of said first pressure tapping, a second pressure tapping from said conduit downstream of said flow-restricting device, a pressure-responsive device connected to be responsive to the difference between the pressure in said first pressure tapping and the pressure in said second tapping and connected to vary the output of said fuel pump so that the output is increased on decrease of said difference and vice-versa, a valve in said conduit between said two pressure tappings, a second pressure responsive device connected to be responsive to said difference and arranged to apply to said valve an opening load proportional to said difference, and a loading device connected to apply to said valve, a closing load, whereby said valve is closed when said opening load is less than said closing load and is open when said opening load exceeds said closing load.

6. In a control system for a variable delivery fuel pump of a gas-turbine engine, a fixed capacity pump arranged to be driven at a speed proportional to engine speed, a discharge conduit for said pump, a first pressure tapping from said conduit, a variable area flow-restricting device in said conduit downstream of said first pressure tapping, a second pressure tapping from said conduit downstream of said flow-restricting device, a pressure-responsive device connected to be responsive to the difference between the pressure in said first pressure tapping and the pressure in said second tapping and connected to vary the output of said fuel pump so that the output is increased on decrease of said difference and vice-versa, a valve in said conduit between said two pressure tappings, a flexible diaphragm arranged to be subject on the one side to pressure in said first pressure tapping and on the other side to pressure in said second pressure tapping and connected to said valve so that said valve is loaded to open with an opening load proportional to the difference between said pressure in said first tapping and pressure in said second tapping, and a precompressed spring abutting said diaphragm so that a closing load is applied from said spring through said diaphragm to said valve.

7. In a control system for a variable delivery fuel pump of a gas-turbine engine, a fixed capacity pump arranged to be driven at a speed proportional to engine speed, a discharge conduit for said pump, a first pressure tapping from said conduit, a variable area flow-restricting device in said conduit downstream of said first pressure tapping, a second pressure tapping from said conduit downstream of said flow-restricting device, a pressure-responsive device connected to be responsive to the difference between the pressure in said first pressure tapping and the pressure in said second tapping, and connected to vary the output of said fuel pump so that the output is increased on decrease of said difference and vice versa, a valve in said conduit between said two pressure tappings, a flexible diaphragm arranged to be subjected on the one side to pressure in said first pressure tapping, and on the other side to pressure in said second pressure tapping, and connected to said valve so that said valve is loaded to open with an opening load proportional to the difference between said pressure in said first tapping and said pressure in said second tapping, a precompressed spring abutting said diaphragm so that a closing load is applied from said spring through said diaphragm to said valve, and a resilient evacuated bellows subjected externally to atmospheric pressure, and arranged to apply a further closing load to said valve proportional to said atmospheric pressure.

8. In a control system for a variable delivery fuel pump of a gas-turbine engine, a fixed capacity pump arranged to be driven at a speed proportional to engine speed, a discharge conduit for said fixed capacity pump, a pressure responsive device connected to the variable delivery fuel pump so as to selectively increase and decrease its delivery, a first pressure tapping from said conduit communicating at all times with one side of said device, and a second pressure tapping from said conduit spaced downstream of said first pressure tapping along said conduit and communicating at all times with the opposite side of said device, said device being responsive to the pressure difference between the pressures in said tappings when said pressure differences decrease and increase, a variable area flow-restricting device in said conduit between said pressure tappings a valve in said conduit between said two pressure tappings for at times interrupting flow along said conduit intermediate said first tapping and said second tapping, a second pressure responsive device arranged to be responsive to said pressure difference and connected to load said valve with an opening load proportional to said pressure difference, and a loading device connected to load said valve with a closing load, whereby said valve is closed when said opening load is less than said closing load and is open when said opening load exceeds said closing load.

9. In a control system for a variable delivery fuel pump of a gas-turbine engine, a fixed capacity pump arranged to be driven at a speed proportional to engine speed, a discharge conduit for said pump, a first pressure tapping from said conduit, a variable area flow-restricting device in said conduit downstream of said first pressure tapping, a second pressure tapping from said conduit downstream of said flow-restricting device, a pressure responsive device connected to be responsive to the difference between the pressure in said first pressure tapping and the pressure in said second tapping and connected to vary the output of said fuel pump so that the output is increased on decrease of said difference and vice-versa, a valve in said conduit between said two pressure tappings, a second pressure responsive device connected to be responsive to said difference and arranged to apply to said valve an opening load proportional to said difference, a loading device connected to apply to said valve a closing load, a fluid connection between said first and second pressure tappings, a control valve in said connection, a third pressure responsive device responsive to said difference and arranged to apply an opening load to said control valve, a second loading device arranged to apply a closing load to said control valve, and an evacuated resilient bellows subjected externally to atmospheric pressure and arranged to abut between the first mentioned valve and said control valve thus to apply equal closing loads to both said valves, the arrangement being such that said first-mentioned valve opens when said difference has a smaller value than it has when said control valve opens.

KENNETH ROY DAVIES.
KARL HERBSTRITT.

REFERENCES CITED

The following references are of record in the file of this patent:

UNITED STATES PATENTS

| Number | Name | Date |
|---|---|---|
| 1,814,631 | Ray | July 14, 1931 |
| 2,219,994 | Jung | Oct. 29, 1940 |
| 2,445,113 | Green et al. | July 13, 1948 |

FOREIGN PATENTS

| Number | Country | Date |
|---|---|---|
| 493,174 | Great Britain | Oct. 3, 1938 |